Sept. 6, 1932.    M. C. WHEELER ET AL    1,875,536
CONTINUOUS BUTYL ALCOHOL FERMENTATION PROCESS
Filed April 9, 1932    2 Sheets-Sheet 1
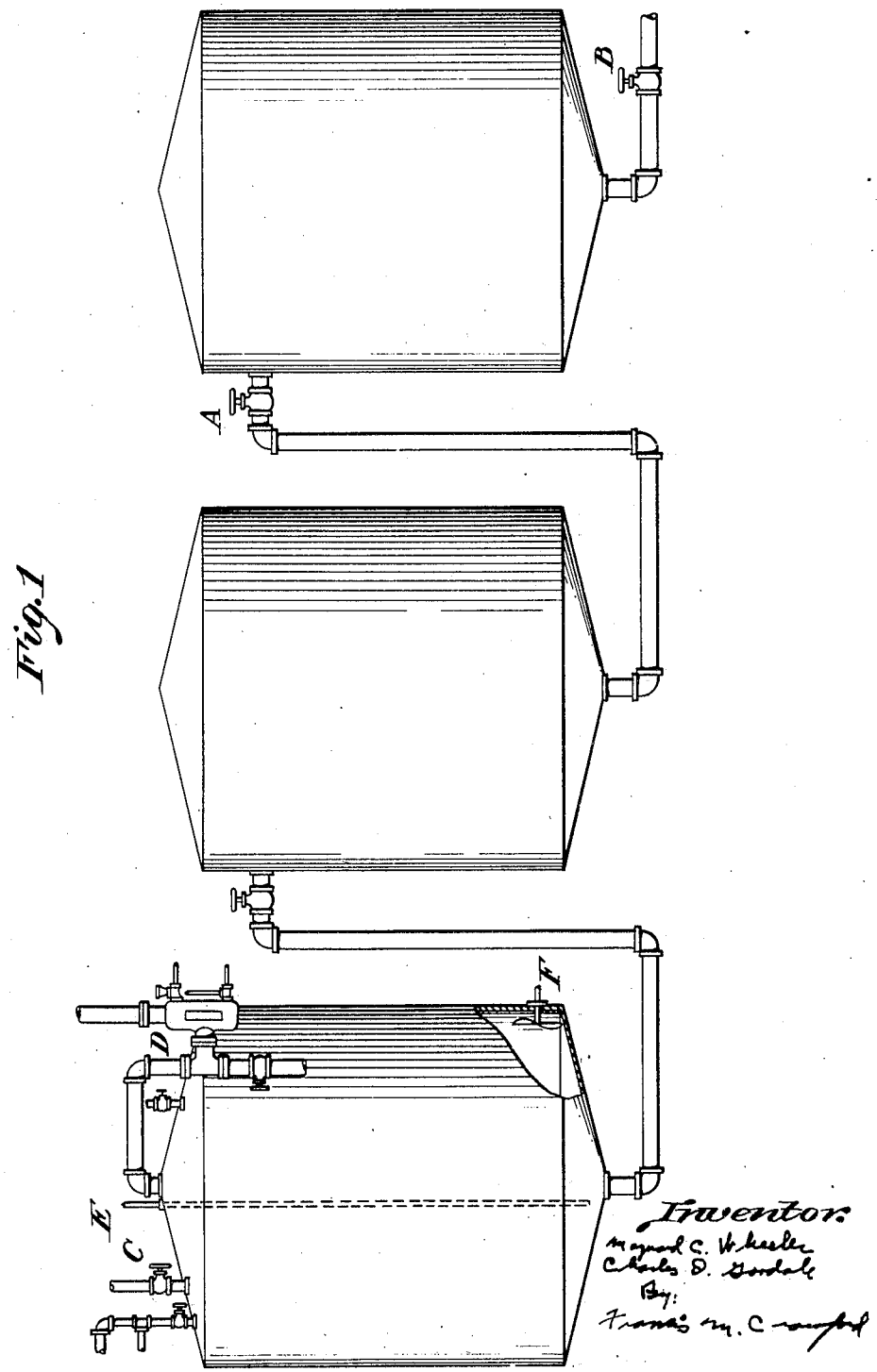

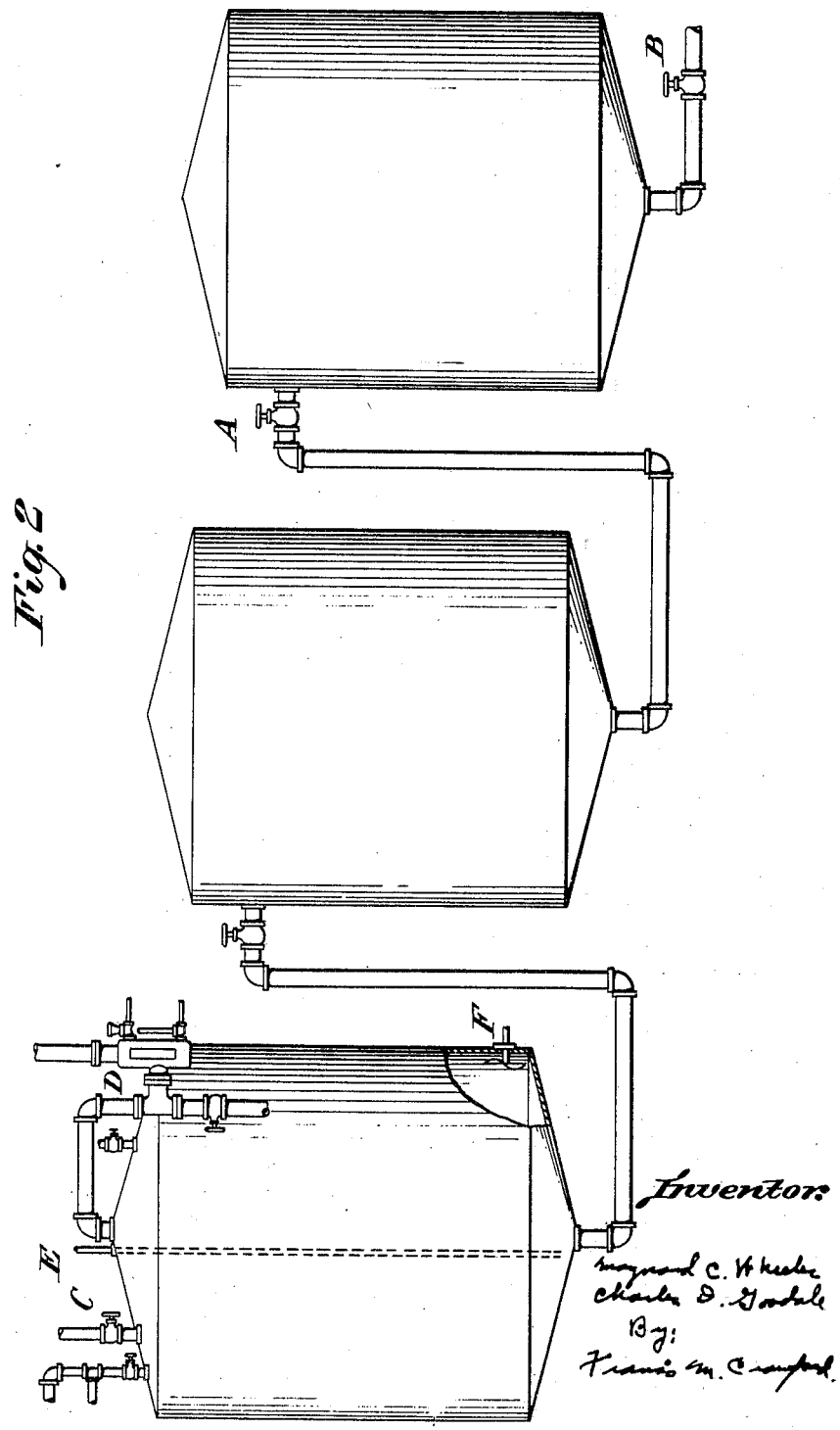

Patented Sept. 6, 1932

1,875,536

UNITED STATES PATENT OFFICE

MAYNARD C. WHEELER AND CHARLES D. GOODALE, OF TERRE HAUTE, INDIANA, ASSIGNORS TO COMMERCIAL SOLVENTS CORPORATION, OF TERRE HAUTE, INDIANA, A CORPORATION OF MARYLAND

CONTINUOUS BUTYL ALCOHOL FERMENTATION PROCESS

Application filed April 9, 1932, Serial No. 604,473, and in Canada January 22, 1929.

The present invention relates to a continuous process for the fermentation of carbohydrate-containing mashes by means of butyl alcohol producing bacteria. More specifically the present invention relates to the production of normal butyl alcohol together with other products such as acetone or isopropyl alcohol and ethyl alcohol by the continuous fermentation of carbohydrates such as maize, wheat, oats, cassava, molasses, wood sugar, xylose, and other fermentable carbohydrates by means of organisms such as Clostridium acetobutylicum (Weizmann), Cl. butylicum, Cl. beijerinckii, B. butylaceticum, B. butylicus B. F., and B. granulobacter pectinovorum, etc.

The production of normal butyl alcohol and acetone by the fermentation of carbohydrates has been carried out successfully on a large scale for a number of years. The operation, however, has been carried out only in a discontinuous manner which has certain disadvantages apparent to those skilled in the art. For example, with the use of the batch process a larger amount of equipment is necessary than is needed for the continuous process, greater time is required for the completion of the fermentation and there is likely to be variation in results. However, all previous attempts to operate the fermentation in a continuous manner have met with failure.

The production of n-butyl alcohol and acetone by fermentation has formerly been carried out substantially as follows: Maize or other similar carbo-hydrate material is ground to a coarse meal which is then mixed with sufficient water to give approximately an 8% by weight concentration of maize. If desired, the corn germ and a portion of the bran may be removed prior to mashing. The resulting mixture of maize meal and water is introduced into pressure cookers provided with suitable agitators, where it is heated with live steam at approximately thirty pounds pressure for two hours. This operation serves the double purpose of thoroughly sterlizing the mash and at the same time converting the starch of the maize into a form more easily acted upon by the bacteria.

Two "cooks" of mash consisting of about 5,600 gallons each, prepared in the manner described above, are cooled to approximately 37° C. and then introduced into a 50,000 gallon capacity fermenter which has previously been thoroughly sterilized. The mash is next inoculated with a culture of butylacetonic bacillus, preferably Clostridium acetobutylicum (Weizmann). The amount of inoculum may vary, but it is generally preferred to use about 2% by volume. At subsequent intervals of about four hours, additional mash is added in lots of either one or two "cooks" (consisting of about 5,600 gallons each) until the fermenter contains a total of seven "cooks." It is thus seen that twelve hours or more time must elapse before the fermenter reaches its maximum fermenting capacity. A normal fermentation is usually completed in aproximately 52 hours from the time of inoculation. During the course of the fermentation abundant quantities of hydrogen and carbon dioxide gases are liberated and solvents in approximately the ratio of six parts of n-butyl alcohol, three parts of acetone and one part of ethyl alcohol are formed. At the conclusion of the fermentation, the fermented mash is dumped into a storage tank, from which it is pumped, as desired, to the stills used for separating and purifying the various constituents.

Before another operation can be carried out in the same fermentation vat, a painstaking and time-consuming process of cleaning and sterilization must be resorted to in order to avoid the introduction and cultivation of contaminant microorganisms in succeeding charges which would either act as parasites on the butyl-acetonic bacilli or form from the carbohydrate material of the mash substances other than n-butyl alcohol and acetone; in either case the result being that lower yields of the desired products are obtained. After dumping the fermented mash, the fermenter must be steamed to remove hydrogen and carbon dioxide gases. Next, the fermenter must be thorough washed and then sterilized with live steam for a number of hours; after which it must be allowed to cool. Altogether, at least twelve hours are consumed in the preparation of the fermenter for a new charge.

It is apparent from the above description of the previously used process that a number of disadvantages are present which it would be desirable to overcome by means of a continuous process. However, as was previously pointed out, attempts to operate the butyl alcohol fermentation in a continuous manner have prior to the present time met with failure, notwithstanding the successful continuous operation of the yeast fermentation. It has now been found that the failure of prior workers to accomplish this object has been caused, at least in part, by a failure to recognize certain fundamental differences between the butyl alcohol bacteria and yeast or other microorganisms. As is well known to those skilled in the art, most of the microorganisms utilized in commercial fermentations such as for example, yeast, lactic acid bacteria, propionic acid bacteria, etc., do not form spores and do not pass through a life cycle of various morphological and physiological forms. Likewise, the fermentations carried out by these organisms do not pass through successive stages in which various different products are built up and subsequently transformed into the final products. However, in the case of the butyl alcohol bacteria, the organisms pass through a distinct life cycle including the clostridia and free spore stages, and the fermentation itself passes through a cycle in which a pronounced acidity peak is first reached and later reduced as the concentration of final products is built up. Other factors in the fermentation pass through cycles as well, for example, the oxidation-reduction potential.

The discovery has now been made that the tendency for the butyl alcohol bacteria to pass through this life cycle and finally to reach an inactive spore state has been responsible for previous failure to accomplish a continuous fermentation with these organisms. It has now been found that this difficulty can be overcome by regulating the fermentation conditions and particularly the rate of flow of mash so as to maintain the organisms in the first stages of the fermentation in a state of vegetable growth and high activity so that the tendency to pass through the normal life cycle is overcome. In this manner a continuous fermentation may be carried out without any of the difficulties previously encountered, thus eliminating most of the disadvantages of the batch process previously referred to. The method for regulating the fermentation conditions in order to secure continuous fermentation will be described below and may possibly best be illustrated by the specific example there given:

In the continuous fermentation process a series of fermenters is utilized, for example, from 3 to 5, or more if desired. These fermenters may be of the same general character and size as employed in the previously used discontinuous system and are connected to each other in series by means of suitable piping which discharges the mash from one fermenter and conveys it into the next fermenter of the series. The fermenters may all be located on the same level but it is preferred to have the different fermenters of the same series so arranged that the bottom of each succeeding fermenter is about one foot lower than that of the immediately preceding one, in order to facilitate the transfer of the mash. It is preferred to withdraw the mash from near the bottom of one fermenter and introduce it into the next fermenter of the series at a point near the top. The piping connections may, however, be otherwise suitably arranged in any manner which would normally occur to one skilled in the art.

Suitable means may be provided in each fermenter for the agitation of the mash. This may be accomplished mechanically or by the introduction of sterile air or preferably sterile fermentation gases. In certain types of butyl alcohol fermentations, especially in the fermentation of starchy carbohydrates by means of butyl-acetonic bacteria of the Weizmann type, there is a tendency for the mash to form a "head" during the early stages of the fermentation. That is, when the rate of gas evolution is insufficient to thoroughly agitate the mash but is sufficient to carry upward some of the solid material, a "head" of unfermented material will be found to form at the top of the mash. In such cases it is particularly desirable to provide means for agitating the mash in order to maintain a uniform medium, especially immediately prior to transferring the mash to the succeeding fermenter.

In carrying out the present process, the entire system of fermenters and associated connections are first thoroughly cleaned and sterilized in the same manner previously employed in the art. When the sterilization has been completed it is preferable to proceed as follows: Two "cooks" or about 2/7 of the total amount of sterile mash required to charge the first fermenter is cooled to a temperature of approximately 37° C. and introduced through sterile connections into the latter. The mash is then inoculated with a culture of butyl alcohol bacterial, for example, Clostridium acetobutylicum (Weizmann)—and fermentation allowed to take place. At subsequent intervals of about four hours, other charges each consisting of about two "cooks" are introduced into the same fermenter until a total of six "cooks" have been added. The fermentation is then preferably allowed to continue uninterrupted without the addition of further raw material for a number of hours until a high concentration of the butyl-acetonic micro-organism has been built up in the medium and a vigorous fermentation is taking place. Usually, about twelve hours time after the addition of the third batch of raw material to the fermenter, the amount of total solvents present in the fermenting mash will be about 5 to 8 grams per liter (in the case of 6% mash), representing about 30% to 45% of the final yield. The fermentation at this stage must not be allowed to progress beyond the logarithmic growth phase of the bacteria, in order that the culture remain in the active vegetative state. By logarithmic growth phase is meant the growth phase in which there is the maximum rate of increase of the organisms (see Buchanan and Fulmer, Physiology and Biochemistry of Bacteria, Williams & Wilkins Co., Baltimore 1928, Volume I, page 17).

The drawings accompanying this specification show diagrammatically several different modifications of apparatus suitable for carrying out this process. Figure 1 shows three fermenters located on the same level; Figure 2, a similar series, the different members of which are placed on different levels. In the figures only three fermenters are shown connected in series but more may be used if desired. The various connections and fittings on each fermenter are in general the same and hence for convenience have been shown only on the first fermenter of the series. The sterile mash is introduced into the system at (C) and the fermented material leaves the system at (B). The hydrogen and carbon dioxide gases evolved during the fermentation are vented through the water seal (D). Sterile air or gas for the agitation of the fermenting mash may be introduced through the pipe (E). If desired, however, the agitation may be conducted by a mechanical agitator such as that shown at (F).

As soon as it is observed that a sufficiently vigorous fermentation is taking place, the addition of sterile raw material to the same fermenter is again begun and then continued at definite intervals as long as desired or until optimum yields are no longer obtained. The capacity of the fermenter being only about seven "cooks", an amount equivalent to about one "cook" will be forced over into the second fermenter of the series when the fourth charge is added to the first fermenter. The additional of sterile mash is continued in like manner until the entire series of fermenters has been filled. After this point has been reached, the addition of each new lot of sterile mash to the first fermenter of the series causes an equal amount of fermenting mash to flow from each of the fermenters into the next in the series, and finally an equal amount of completely fermented mash flows from the last fermenter of the series.

The time interval between the additions of sterile mash to the first fermenter must be such that the entire detention time of the mash in the first fermenter is sufficiently short so as to prevent the organisms from continuing their normal life cycle beyond the active vegetative state. In other words, the rate of flow of the mash must be maintained such that the bacteria remain in the first fermenter of the series for a period less than the logarithmic growth period of the organisms in a normal batch fermentation. This logarithmic growth period is known for some of the butyl alcohol organisms, for example, Clostridium acetobutylicum (Wiezmann). In any event it may be readily determined by one skilled in the art by the simple expedient of carrying out the fermentation and determining the numbers of the various morphological forms present at intervals throughout the fermentation. It may be found that this time will vary for the same organism in different types of mashes, so that for an accurate determination the same type of mash should be employed which is to be utilized in the continuous fermentation process.

Although the time interval must be maintained within the limits above outlined, it will, of course, be found that the optimum time will depend upon a number of factors such as for example, the nature of the mash, the concentration of the mash utilized, the number of fermenters employed in the series, the temperature at which the fermentation is carried out, and the completeness of fermentation desired. For example, in the particular fermentation described above it has been found that a time interval of about 2 hours and 40 minutes between charges is about the optimum when using a 6% concentration of maize mash with five fermenters in the series. It is seen that with such an interval the mash in the first fermenter is completely displaced in a time somewhat less than 10 hours, i. e., within the normal logarithmic growth period of the organism employed.

As will be apparent to one skilled in the art, after equilibrium in the system has been attained, and a high concentration of bacteria has been built up in the first fermenter, the time interval may possibly be further reduced. This will be due to the elimination of the lag phase of the fermentation because of the large number of active cells serving as the inoculum. In this manner it has been possible to obtain complete fermentation with Cl. acetobutylicum (Weizmann) in thirty hours as compared to fifty-two hours in the batch process.

As an alternative method of carrying out the process described above, the following procedure may be employed: After the entire series of fermenters has been filled and vigorous fermentation is under way, an amount of completely fermented mash equivalent in volume to two "cooks" is withdrawn from the last fermenter of the series before mash is allowed to enter this fermenter from the immediately preceding fermenter. When this operation has been completed, an equal amount of mash is transferred from the next to the last, to the last fermenter of the series, care being taken to prevent the admission of mash into this fermenter from the fermenter immediately ahead of it in the series, until the desired charge has been transferred to the last fermenter. This transfer of mash may be effected by means of a centrifugal pump placed between the two fermenters or by means of steam, sterile air, or sterile gas pressure applied to the fermenter from which the mash is being removed, or by having the fermenters on a slightly different level, as shown in Figure 2. The operation, which has just been described is repeated in turn with the other fermenters of the series until the first fermenter is reached. After the removal of partially fermented mash from this fermenter, a new charge of sterile mash is introduced. Such a procedure as just outlined eliminates entirely the danger of any mash passing through a given fermenter without undergoing in that fermenter, the required degree of fermentation.

Still another modification of the present process, which works very satisfactorily in cases where it is not practical to arrange the fermenters so that they are on slightly different levels, is as follows: After the entire series of fermenters has been filled and vigorous fermentation is under way, a valve (A) is closed between the last two fermenters (see Figure 1) and an amount of fermented mash equivalent to two "cooks" is removed from the last fermenter of the series. The exit valve (B) from the last fermenter is then closed and the valve (A) between the last two fermenters opened. Sterile mash is then introduced into the first fermenter of the series under a slight pressure through the aperture closed by the valve (C). During the course of the equalization of the pressure through the series of fermenters, partially fermented mash is forced from each of the first fermenters of the series into the next succeeding, the pressure in the final fermenter being equalized by venting the gas therein through an opening to a system for collecting hydrogen and carbon dioxide gases, or it may be vented directly into the air through a sterile pad of cotton gauze or through steam or a water seal similar to that shown at (D) on the first fermenter of the series.

An obvious modification of the process which has been described would be the continuous addition of fresh mash instead of the addition at stated intervals. There are certain advantages, from an operating standpoint, in adding the material in batches rather than continuously, especially when solid carbohydrate such as maize is employed. However, in the case of molasses or other sugar solutions, it is seen that the continuous addition might be advantageously employed. In any event, it is to be pointed out that the rate of addition must be such that the mash in the first fermenter is completely displaced in a time within the normal logarithmic growth period of the organism employed.

In operating according to this new and improved process the fermentation may be continued for long periods of time—thirty days or longer—without interruption. During the entire period of fermentation a saving of approximately twelve hours time out of every sixty-five is effected due to the fact that sterilization of the apparatus does not have to be resorted to so often as in the case of the discontinuous process. An additional ten or twelve hours out of each complete cycle gone through by a fermenter operated by the discontinuous process is also saved when operating by this improved process, due to the fact that there is no incubation period or delay in the fermentation reaching its maximum efficiency, after the continuous series has once been started up. Under normal operation by the discontinuous process, approximately forty-five fermentations can be completed in thirty days, using five fermentation vats. By using this improved continuous process, as high as approximately sixty-seven fermentations can be completed in the same length of time from the same number of fermentation vats; in case it is desired to start a new fermentation every fifteen days instead of every thirty days, a total approximately fifty-six fermentations can be completed per thirty days from the same series of five fermenters. In either case, it is readily seen that a large increase in yield over the methods at present in use can be obtained by the use of this improved continuous process. An appreciable saving is likewise effected in the amount of labor, steam, power and other incidental equipment necessary to operate the process.

There are also other distinct advantages to be gained in operating according to the present process. The fermentation products as well as the metabolic by-products formed during the fermentation act as poisons or growth inhibitors towards the butyl alcohol bacteria and consequently have a harmful effect on the fermentation after an appreciable concentration of these materials has been built up. In the present process this difficulty is avoided by withdrawing the fermentation products from the first fermenter in the series at a rate such that a concentration of these materials sufficiently high to adversely effect the organisms can not obtain. Likewise, the acidity and oxidation reduction potential do not reach their respective maximum and minimum in the first fermenter when such a rate of flow of the mash is maintained. When these inhibiting factors which are present in the normal batch fermentation are thus prevented, it is seen that a concentration of active vegetative cells may be built up which is greatly in excess of the number usually obtained in the batch process. Thus the organisms are maintained in a state of high activity during the critical stage of the fermentation, and a sufficient number of these active organisms is also present for the continuous inoculation of freshly added mash.

It is to be distinctly understood that the present invention is not to be limited to the specific bacteria or carbohydrate materials mentioned above. Any of the butyl alcohol producing bacteria and any carbohydrates fermentable by such bacteria may be employed. Likewise, it is to be understood that the invention is not to be limited to the use of the apparatus described or the particular example cited. The apparatus and examples described are illustrative only and such variations as would naturally occur to one skilled in the art may, of course, be employed.

The present application is a continuation in part of co-pending application Ser. No. 255,014, filed February 17, 1928.

The invention now having been described what is claimed is:

1. A continuous process for the fermentation of carbohydrate-containing mashes by means of butyl alcohol producing bacteria, which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period included in the normal logarithmic growth period of the bacteria.

2. A continuous process for the fermentation of carbohydrate-containing mashes by means of butyl alcohol producing bacteria, which comprises adding sterile mash to the first of a plurality of fermenters connected in series, inoculating said mash with a culture of said bacteria, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period included in the normal logarithmic growth period of the bacteria.

3. A continuous process for the fermentation of carbohydrate-containing mashes by means of butyl alcohol producing bacteria, which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period of less than ten hours.

4. A continuous process for the fermentation of carbohydrate-containing mashes by means of butyl alcohol producing bacteria, which comprises adding sterile mash to the first of a plurality of fermenters connected in series, inoculating said mash with a culture of said bacteria, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period of less than ten hours.

5. A continuous process for producing normal butyl alcohol, acetone and ethyl alcohol by the butyl-acetonic fermentation of carbohydrates, which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period included in the normal logarithmic growth period of the bacteria.

6. A continuous process for producing normal butyl alcohol, acetone and ethyl alcohol by the butyl-acetonic fermentation of carbohydrates, which comprises adding sterile mash to the first of a plurality of fermenters connected in series, inoculating said mash with a butyl-acetonic bacillus, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period included in the normal logarithmic growth period of the bacteria.

7. A continuous process for producing normal butyl alcohol, acetone and ethyl alcohol by the fermentation of carbohydrates with Clostridium acetobutylicum (Weizmann), which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period included in the normal logarithmic growth period of the bacteria.

8. A continuous process for producing normal butyl alcohol, acetone and ethyl alcohol by the fermentation of carbohydrates with Clostridium acetobutylicum (Weizmann), which comprises adding sterile mash to the first of a plurality of fermenters connected in series, inoculating said mash with a culture of said bacteria, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period included in the normal logarithmic growth period of the bacteria.

9. A continuous process for producing normal butyl alcohol, acetone and ethyl alcohol by the butyl-acetonic fermentation of carbohydrates, which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period of less than ten hours.

10. A continuous process for producing normal butyl alcohol, acetone and ethyl alcohol by the butyl-acetonic fermentation of carbohydrates, which comprises adding sterile mash to the first of a plurality of fermenters connected in series, inoculating said mash with a butyl-acetonic bacillus, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period of less than ten hours.

11. A continuous process for producing normal butyl alcohol, acetone and ethyl alcohol by the fermentation of carbohydrates with Clostridium acetobutylicum (Weizmann), which comprises conducting said process in a plurality of fermenters connected in series while adding fresh mash to the first of said fermenters and removing fermented mash from the last fermenter of the series and maintaining the flow of mash at a rate such that there will be a complete displacement of the mash in the first fermenter in a period of less than ten hours.

12. A continuous process for producing normal butyl alcohol, acetone and ethyl alcohol by the fermentation of carbohydrates with Clostridium acetobutylicum (Weizmann), which comprises adding sterile mash to the first of a plurality of fermenters connected in series, inoculating said mash with a culture of said bacteria, making further addition of sterile mash to the first fermenter of the series, causing partially fermented mash to flow from the first fermenter through the other fermenters of the series until all have been filled, removing a definite portion of fermented mash from the last fermenter of said series while preventing the influx of partially fermented material, and then adding to the first fermenter an amount of fresh mash equivalent in volume to the fermented mash withdrawn from the last fermenter, said withdrawals and additions of mash being made at intervals such that there is a complete displacement of the mash in the first fermenter in a period of less than ten hours.

In testimony whereof we affix our signatures.

MAYNARD C. WHEELER.
CHARLES D. GOODALE.